United States Patent [19]

Guzman

[11] Patent Number: 5,420,917
[45] Date of Patent: May 30, 1995

[54] AUTOMATED RECOVERY OF TELECOMMUNICATION NETWORK ELEMENTS

[75] Inventor: Richard L. Guzman, Hillsborough, N.J.

[73] Assignee: AT&T Corp., Murray Hill, N.J.

[21] Appl. No.: 164,496

[22] Filed: Dec. 9, 1993

[51] Int. Cl.⁶ .................................................. H04M 3/00
[52] U.S. Cl. ..................................... 379/279; 379/221; 370/16
[58] Field of Search ......................... 379/220, 221, 279; 370/16

[56] References Cited

U.S. PATENT DOCUMENTS

| | | | |
|---|---|---|---|
| 5,138,657 | 8/1992 | Colton et al. | 379/220 |
| 5,146,452 | 9/1992 | Pekarske | 370/16 |
| 5,182,744 | 1/1993 | Askew et al. | 370/16 |
| 5,222,128 | 6/1993 | Daly et al. | 379/221 |

OTHER PUBLICATIONS

Emerson, Cole H., "Putting Out the Fire," Security Management, vol. 33, No. 6, Jun. 1989, pp. 64–68.
Harrison, John S., "Business Resumption Planning: Are All Aspects Considered?," Texas Banking, vol. 82, No. 4, Apr. 1993, pp. 17–18.
Okanoue, et al., "Integrated Self-Healing Techniques for SONET Survivability," NEC Research and Development, vol. 33, Issue 4, Oct. 1992, pp. 655–668.
Rosenthal, P. H. et al., "Business Resumption Planning: Exercising the Disaster Management Team," Journal of Systems Management, vol. 44, No. 6, Jun. 1993, pp. 12–16, 38–40.
"Digital Cross-Connect Systems in Transport Network Survivability," Bell Communications Research Special Report SR-NWT-002514, Issue I, Jan. 1993, pp. v–ix; 2-1-2-12.
Wakamoto et al, "Transportable Electrical Switching System", Japan Telecommunications Review, Apr. 1977, vol. 19.

Primary Examiner—James L. Dwyer
Assistant Examiner—Parag Dharia

[57] ABSTRACT

A method of automating restoration of service to damaged or destroyed telecommunication network elements. The method automates the restoration process by employing several operations support systems to collect data about the damaged network elements and to generate and implement a restoration plan. The restoration plan is executed automatically on a disaster recovery vehicle as a replacement for the damaged network elements. The method also assures the resumption of normal business planning by updating engineering and operations support databases.

13 Claims, 4 Drawing Sheets

AUTOMATED RECOVERY OF TELECOMMUNICATION NETWORK ELEMENTS

FIELD OF THE INVENTION

The present invention relates to telecommunication systems. More particularly, the present invention relates to the restoration of service to damaged or destroyed telecommunication network elements.

BACKGROUND OF THE INVENTION

A natural or human-caused disaster can impair significantly the operation of a telecommunication network element. A telecommunication network element may fail, for example, due to damage or destruction by one of several disaster events. Such disaster events include damage or destruction by fire, flood, earthquake, war, sabotage, or terrorist activity. Several scenarios, including the following, are possible: partial failure of a network element, such as a Digital Access and Cross-Connect System (DACS) frame; failure of a single network element such as a DACS; failure of multiple network elements; and failure of an entire node of network elements. DACS network elements are described generally in an article by R. P. Abbott and D. C. Koehler, "Digital Access and Cross-Connect System—System Architecture," NTC '81, IEEE, National Telecommunication Conference, vol. 1, pp. B.1.2.1-B.1.2.7 (1981). This article and all other articles, patents or texts referred to herein are incorporated by reference.

Currently, the primary method of contingency and disaster recovery relies on data stored only in each network element unit. The data's availability for disaster recovery is highly valuable for planning and recovery of a vital core network. Similarly, the data is highly valuable for planning and recovery of Presidential, government, military, and commercial private telecommunication lines travelling through network elements. Although the data about the mapping states of each circuit traversing through the network element is important for restoring the service to its original pre-disaster state, the data stored within each unit is relatively volatile and vulnerable to destruction in a disaster.

Under existing restoration methods, additional limitations are present. Specifically, restoration of a network element occurs serially, circuit by circuit. Each circuit of each network element in the affected office requires new circuit layouts before service restoration can occur. Furthermore, this step must take place prior to reestablishing cross-connections between circuits. These limitations result in long time delays before service can be restored. For example, an AT&T DACS Operations Support System (DACS-OSS) can restore circuits serially at the rate of approximately ten circuits per minute. AT&T commercially available DACS I, DACS II, and DACS II CEF network elements have approximately 1,536, 7,680, and 32,256 circuits respectively, not including any Subrate circuits. These numbers translate to current restoration periods of approximately 1-8 hours for each DACS I, 1-12 hours for each DACS II, and up to 50 hours for each DACS II CEF.

Another limitation of the existing method is that it supports like-for-like restoration only. Thus, for example, a damaged or destroyed DACS I network element must be reconstructed on a DACS I network element equipped identically to the failed element.

In addition to the above limitations, the existing process does not permit reconfiguration or rerouting of circuits.

SUMMARY OF THE INVENTION

The present invention provides a method for automating disaster engineering and recovery of telecommunication network elements. The method of the present invention overcomes the limitations of the existing process mentioned above. It provides a method of automating restoration of service to a plurality of failed telecommunication network elements following a disaster event, where said plurality of failed network elements include a plurality of network processing circuits, said method comprising the steps of storing, in an operations support system, DS-1 facility data and sub-DS-1 circuit data pertaining to said plurality of failed network elements prior to said disaster event; connecting a disaster restoration vehicle to guided media associated with said failed network elements, where said disaster restoration vehicle includes a plurality of replacement network elements, where said plurality of replacement network elements may be of a type different from said plurality of failed network elements, and where said plurality of replacement network elements include a plurality of replacement network processing circuits; assigning said plurality of failed network elements to said plurality of replacement network elements using an operations support system; assigning a plurality of DS-1 facilities associated with said plurality of failed network elements to at least a portion of said plurality of replacement network processing circuits using an operations support system; computing a plurality of sub-DS-1 circuit interconnections for said replacement network elements based upon said sub-DS-1 circuit data using an operations support system; setting initial parameters on said portion of said plurality of replacement network processing circuits using an operations support system; and executing said plurality of sub-DS-1 circuit interconnections in said plurality of replacement network elements using an operations support system.

DETAILED DESCRIPTION

Figure 1:
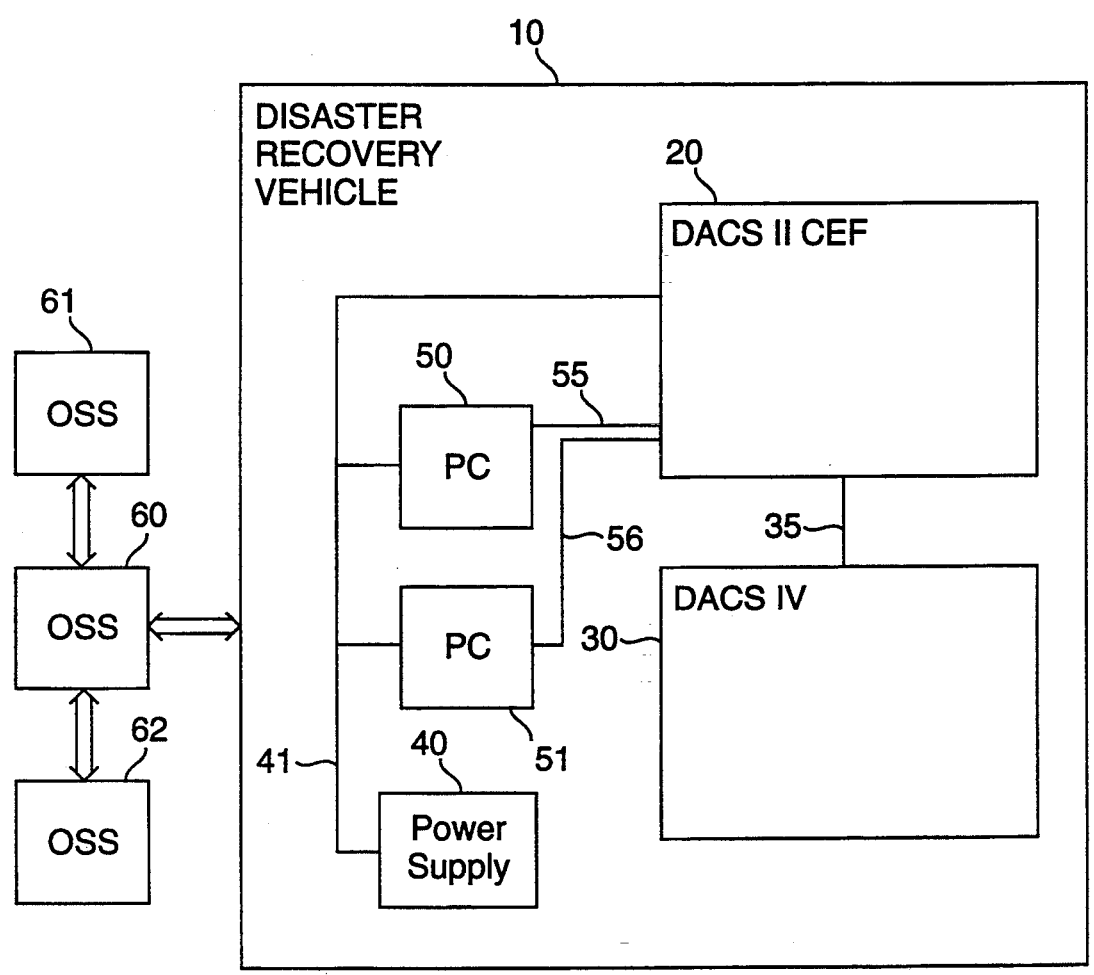
FIG. 1 shows an exemplary disaster recovery vehicle for use in the method of the present invention.
Figure 2:
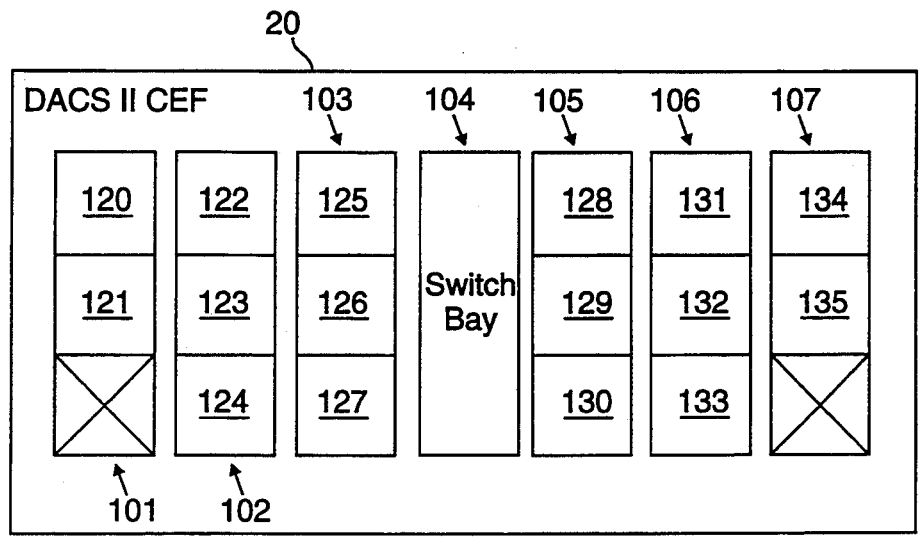
FIG. 2 shows an exemplary DACS II CEF for use on a disaster recovery vehicle.
Figure 3:
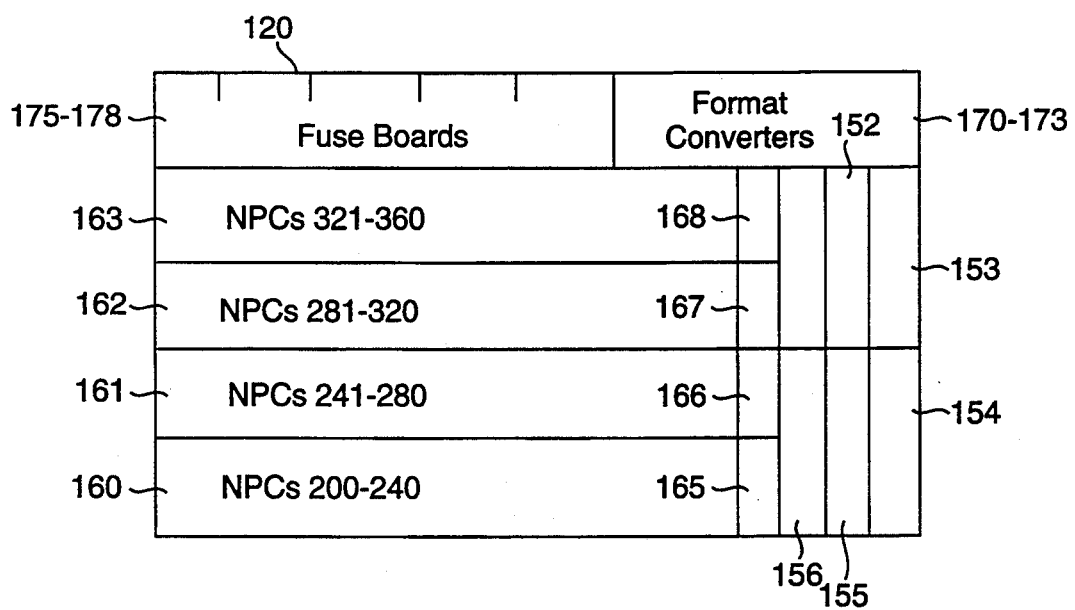
FIG. 3 shows an exemplary Integrated Facility Terminating Unit in a DACS II CEF.

The present invention provides a method for automating disaster engineering and recovery of telecommunication network elements. Specifically, the present invention automates the restoration process through the use of a disaster recovery vehicle or trailer and the employment of several Operations Support Systems (OSSs). FIG. 1 shows an exemplary disaster recovery vehicle or trailer 10, which acts as a self-contained, transportable replacement DACS, and which has its own power source 40 including a battery and generator. The exemplary trailer 10 shown in FIG. 1 includes a DACS II with expanded frame capacity or DACS II CEF 20 which can connect channels from one signal carrier to another and back up its own memory. The DACS II CEF 20 supports multiple frame restoration capacity. Specifically, the DACS II CEF 20 can replace the service of up to twenty DACS I or four DACS II network elements. Referring now to FIG. 2, the DACS II CEF 20 contains at full capacity seven frameworks for mounting equipment subassemblies, or bays 101–107. One of the bays 101–107, for example bay 104, is a switch bay. The other bays 101–103, 105–107 contain a total of fifteen Integrated Facility Terminating Units (IFTUs) 120–135. An IFTU is the hardware used to mount plug-ins for terminating DS-1 facilities. FIG. 3 shows further details of one such IFTU, the IFTU 120. The IFTU 120 includes a central processing unit (CPU) 155, a unit bus extender (UBX) 156, and power supplies 152–154. As further shown in FIG. 3, the IFTU 120 also includes four Facility Terminating Modules (FTMs) 160–163 with associated signal processing packs or interfaces 165–168, format converters 170–173, and fuse boards 175–178. Each of the FTMs 160–163 further includes forty network processing circuits (NPCs) 200–240, 241–280, 281–320, 321–360 respectively, for a total of one hundred and sixty NPCs in the IFTU 120. Facilities, such as T1.5 or DS-1 carriers, can be connected to the NPCs 200–360. The sixteen IFTUs 120–135 of a fully equipped DACS II CEF, therefore, can yield a maximum of 2,560 DS-1 termination points.

The trailer 10 shown in FIG. 1 further includes a DACS IV 30 which can be used for cross-connecting DS-1 and DS-3 signals. The DACS II CEF 20 and the DACS IV 30 are connected by a plurality of cables represented in FIG. 1 by the solid line 35. The trailer 10 also includes two personal computers 50, 51 which are connected respectively by cables 55, 56 to the DACS II CEF 20. The power supply 40 is connected to the computers 50, 51, the DACS II CEF 20, and the DACS IV 30 by a plurality of cables represented by the solid line 41. Finally, a program that resides in one of the computers 50, 51 interacts with another Operations Support System (OSS) 60. The OSS 60 also interacts with other Operations Support Systems 61, 62. Each of the OSSs can further interact with additional OSSs not shown in FIG. 1.

Figure 4:
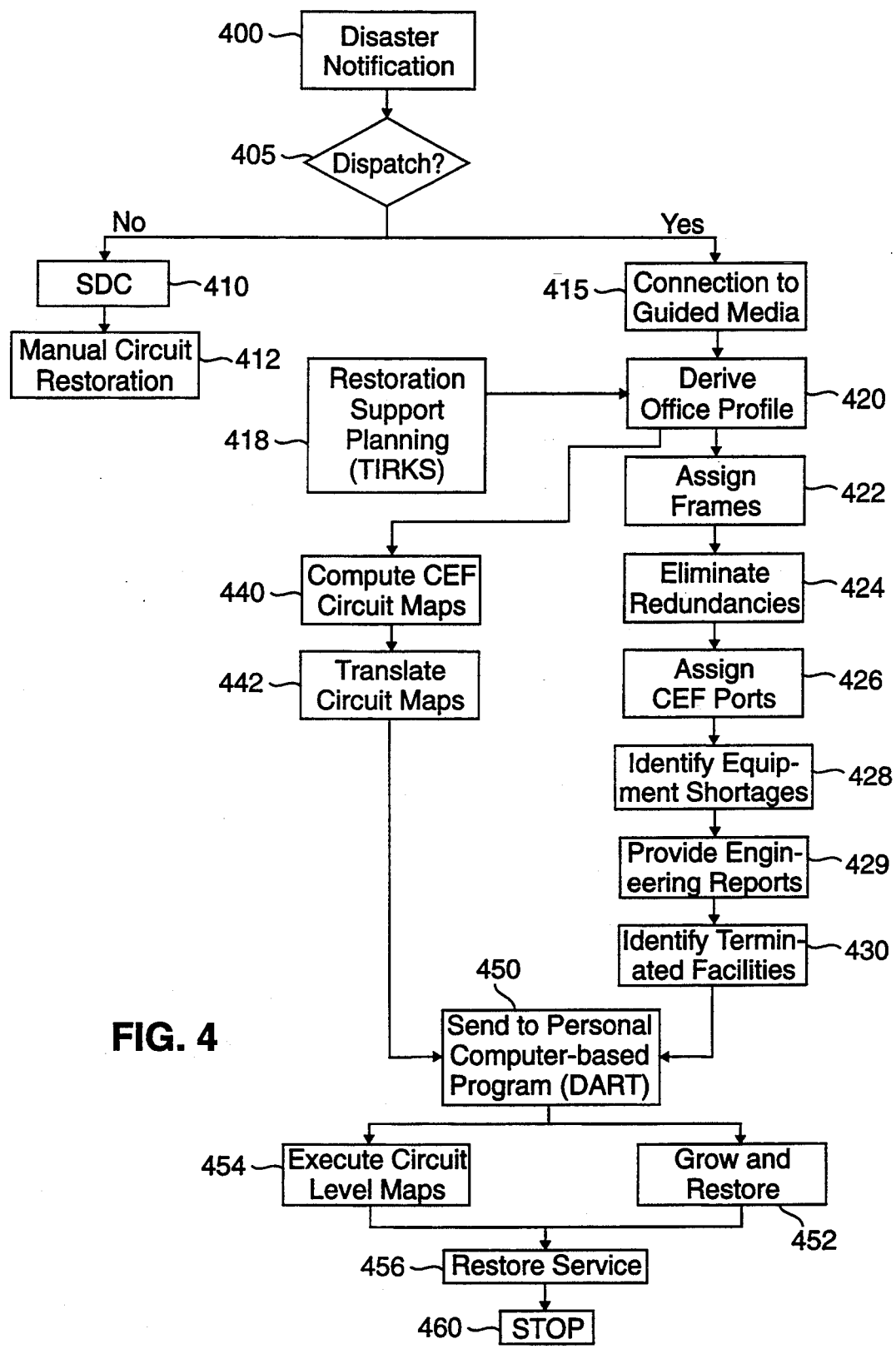
FIG. 4 shows a flow chart of an exemplary restoration process according to the method of the present invention.

FIG. 4 shows a flow chart of the steps of an exemplary restoration implementation process according to the method of the present invention. First, as shown in step 400, a disaster recovery management (DRM) center receives notification that a network element or elements may be or are damaged or destroyed. The disaster recovery management decides whether to dispatch a disaster recovery vehicle, such as the trailer 10 to the location of the damaged or destroyed network element. This decision is shown in "Dispatch" step 405. If, for example, only a small number of single circuits in the network element are damaged, the disaster recovery management may decide that dispatching a trailer is not necessary. A work center that is responsible for ongoing maintenance of network elements, such as a Service Delivery Center (SDC), is then apprised of the situation in step 410. Personnel at the SDC would then manually perform individualized circuit restoration as shown in step 412. If, however, the disaster recovery management decides to dispatch a trailer, then a trailer is sent to the location of the damaged or destroyed network element or elements. At the disaster location, the trailer is connected to usable guided media, such as telephone lines, cellular telephone links or satellite links as shown in step 415.

The next step is to derive an office profile by obtaining detailed information about the disaster location, including the number and type of failed DACS network elements. The disaster location might include, for example, one DACS I and one DACS II. This step is shown as "Derive Office Profile" step 420 in FIG. 4. In support of the step 420, electronic records are stored in near real-time in an operations support system (OSS) prior to the disaster event in "Restoration Support Planning" step 418. The Trunk Integrated Record Keeping System (TIRKS) may serve as such a suitable OSS. TIRKS is a Registered Trademark of Bell Communications Research, Inc. and is described generally in a text edited by R. F. Rey, *Engineering and Operations in the Bell System* at pp. 605–611 (1984). The TIRKS system stores and maintains cross-connect and mapping records of the network elements. These records contain specific and unique information about facilities and individualized circuits and circuit level parameters.

As part of the step 420, another OSS such as a Cutover System (CUTS) requests certain data files from TIRKS or from a Digital Access and Cross-Connect System Operations Support System (DACS-OSS) which requests the data files from TIRKS on a regular periodic basis. One purpose of the request by CUTS is to collect information about the facilities and equipment at the disaster location. Additional facility and equipment data may be obtained via other back-up systems such as AT&T Intelligent Network Self Inventory System (ISIS), which periodically compares facility and circuit level information contained in TIRKS and the actual facility and circuit connections. ISIS, for example can serve an ancillary role in gathering the data to establish the office profile. Based upon this data, a near real-time office profile, containing information about the circuits actually connected in the network elements, is derived.

Once the office profile is provided to CUTS, CUTS automatically assigns frames in the disaster location office to the DACS II CEF frame 20 as shown in step 422. CUTS also reduces the number of inter-CEF connections by eliminating redundancies in the connections of the destroyed facility's frames and determining the most direct and efficient routes between components as shown in step 424. CUTS, therefore, determines the optimal use of components on the DACS II CEF 20 by rearranging and rerouting the interconnections that were on the damaged or destroyed network elements. CUTS also allows engineering personnel to manually override the mechanized assignments of old frames to the DACS II CEF frame 20. Any information provided manually, however, must be provided prior to the start of the automated process in the step 420 or after the end of the process in the step 460. CUTS then automatically assigns facilities, such as T1.5 or DS-1 carriers, to the ports on the DACS II CEF 20 such as the NPCs 200–360 as shown in step 426. Although CUTS is preprogrammed with default configurations, engineering personnel may enter and update the configuration of the trailer 10 prior to the start of the automated process in the step 420. Alternatively, engineering personnel can manually override the mechanized NPC assignments at the end of the process at step 460. Next, CUTS identifies the equipment required to restore the destroyed or damaged DACS frames, and it identifies any equipment shortages in the configuration of the trailer 10 as shown in step 428. Next, CUTS provides engineering personnel with reports detailing the type and location of IFTUs and circuit packs, including how plugs should be reconstructed in step 429. Finally, CUTS prepares a file identifying the T1.5 or DS-1 facilities that are being terminated and the new ports or NPCs on the DACS II CEF 20 such as NPCs 200-360 as shown in step 430. This file drives the creation of DS-1 signal maps on the DACS IV 30.

As part of the "Derive Office Profile" step 420, CUTS simultaneously receives from TIRKS detailed circuit map information for all DACS frames being reconstructed on the DACS II CEF 20. The mapping information may contain, for example, data indicating the connections between NPCs and channels for DS-0 signals. CUTS computes the maps or interconnections to be implemented on the DACS II CEF 20 as shown by "Compute CEF Circuit Maps" step 440. Specifically, CUTS computes and generates the maps or interconnections for sub-DS-1 circuits, including Intermediate Bit Rate, Subrate, 2-point and multi-point circuits. CUTS then translates the data to a format required by a program, such as AT&T DACS Analysis Reconfiguration Tool (DART), that resides in one of the personal computers 50, 51 on the trailer 10. DART is an OSS developed by AT&T Network Systems. This step is shown as "Translate Circuit Maps" step 442.

Next, in step 450, CUTS sends the port or NPC assignment data, the T1.5 facility assignments and the DACS circuit mapping information to DART. DART implements the plan by performing two tasks simultaneously. Alternatively, the DACS-OSS may perform these steps. First, in "Grow and Restore" step 452, DART sets initial specific parameters on the NPCs such as NPCs 200-360. These parameters depend upon the type of service to which each NPC, for example NPC 200, is being restored. Each NPC, for example NPC 200, is then placed in service. Second, DART executes the sub-DS-1 circuit level maps and interconnections. In FIG. 4, this step is represented by "Execute Circuit Level Maps" step 454. Once the NPCs, for example NPCs 200-360, are placed in service, and the circuit level interconnections are implemented, complete service is restored to the DACS II CEF frame 20 as shown in "Restore Service" step 456. The step 456 represents the end of the restoration implementation process and is followed by "Stop" step 460. As indicated above, however, changes or modifications to the connections and circuit mapping on the DACS II CEF 20 may also be made manually by engineering personnel.

Figure 5:
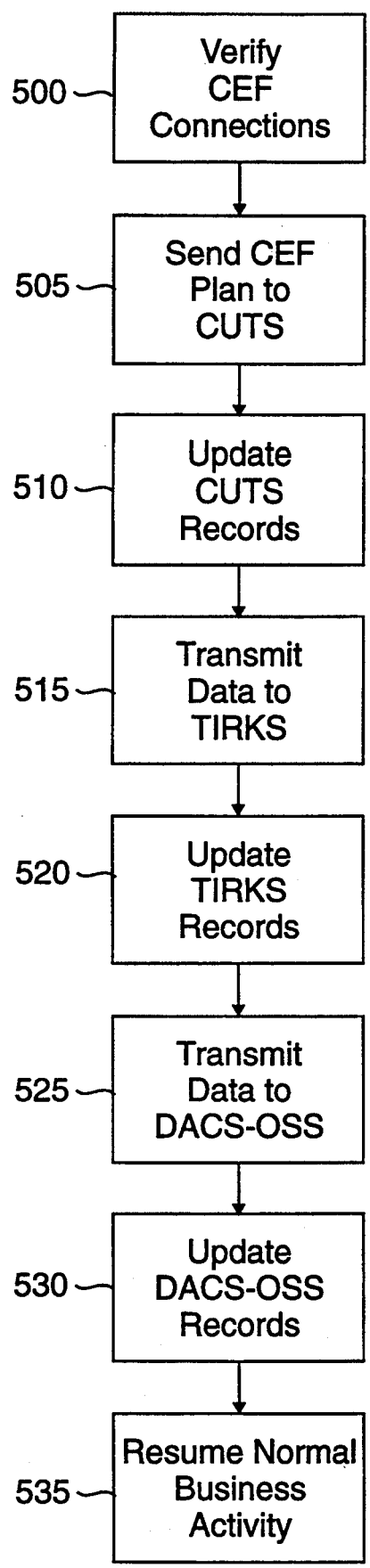
FIG. 5 shows a flow chart of an exemplary restoration records update process according to the method of the present invention.

As an additional feature of the method of the present invention, once service has been restored, a restoration records update may be performed. Such updating of the records contained in the Operations Support Systems permits business to resume to normal operation after service has been restored to the failed network elements. FIG. 5 shows an exemplary flow chart of the restoration records update process. In step 500, DART verifies the connections on the DACS II CEF 20. This information is sent to CUTS in step 505. CUTS then merges the DACS II CEF data with the detailed circuit data previously received from TIRKS. In step 510, CUTS updates its facility and equipment records. In step 515, CUTS then transmits these updated records to TIRKS. TIRKS in turn updates its facility and equipment records to reflect the new layouts of the circuits in step 520. When TIRKS has completed its records updating process, it sends a machine readable work record detail file to the DACS-OSS or to other downstream Operations Support Systems in step 525. Finally, the DACS-OSS automatically updates its records to reflect the new circuit layouts in step 530. The result of this process as shown in step 535 in FIG. 5 is that the records of the various Operations Support Systems are automatically updated to reflect the new circuit layouts and connections on the DACS II CEF 20. Business now can resume normally as it did prior to the telecommunication disaster.

Although this invention has been described and shown with reference to a particular arrangement of a disaster recovery vehicle and to particular Operations Support Systems, it will be readily apparent to those skilled in the art that other arrangements and other Operations Support Systems may be utilized without departing from the spirit and scope of the invention.

I claim:

1. A method of automating restoration of service to a plurality of failed telecommunication network elements following a disaster event, where said plurality of failed network elements include a plurality of network processing circuits, said method comprising the steps of:
    storing, in a first operations support system, DS-1 facility data and sub-DS-1 circuit data pertaining to said plurality of failed network elements prior to said disaster event;
    connecting a disaster restoration vehicle to guided media associated with said failed network elements, where said disaster restoration vehicle includes a plurality of replacement network elements, where said plurality of replacement network elements include a plurality of replacement network processing circuits;
    assigning said plurality of failed network elements to said plurality of replacement network elements using a second operations support system;
    assigning a plurality of DS-1 facilities associated with said plurality of failed network elements to at least a portion of said plurality of replacement network processing circuits using said second operations support system;
    computing a plurality of sub-DS-1 circuit interconnections for said replacement network elements based upon said sub-DS-1 circuit data using said second operations support system;
    setting initial parameters on said portion of said plurality of replacement network processing circuits using a third operations support system; and
    executing said plurality of sub-DS-1 circuit interconnections in said plurality of replacement network elements using said third operations support system.

2. The method of claim 1 wherein the steps of assigning a plurality of failed network elements to said plurality of replacement network elements and assigning a plurality of DS-1 facilities to at least a portion of said plurality of replacement network processing circuits take place concurrently with the step of computing a plurality of sub-DS-1 circuit interconnections for said plurality of replacement network elements.

3. The method of claim 2 wherein the step of setting initial parameters on said portion of said plurality of replacement network processing circuits takes place concurrently with the step of executing said plurality of sub-DS-1 circuit interconnections in said portion of said plurality of replacement network elements.

4. The method of claim 3 further including the steps of:
- determining the optimal connections between said plurality of DS-1 facilities and said plurality of replacement network processing circuits; and
- eliminating redundant DS-1 facilities.

5. The method of claim 4 further including the steps of:
- verifying any terminated DS-1 facilities;
- verifying DS-1 facility assignments;
- verifying said initial parameters on said portion of said plurality of replacement network processing elements;
- verifying said plurality of sub-DS-1 circuit interconnections;
- sending the verified information to at least said first and second operations support systems; and
- updating records in at least said first and second operations support systems so as to permit resumption of normal pre-disaster telecommunication activity.

6. A system for automating restoration of service to a plurality of failed telecommunication network elements following a disaster event, where said plurality of failed network elements include a plurality of network processing circuits, said system comprising:
- means for storing DS-1 facility data and sub-DS-1 circuit data pertaining to said plurality of failed network elements prior to said disaster event;
- a disaster restoration vehicle connected to guided media associated with said failed network elements, where said disaster restoration vehicle includes a plurality of replacement network elements, and where said plurality of replacement network elements include a plurality of replacement network processing circuits;
- means for assigning said plurality of failed network elements to said plurality of replacement network elements;
- means for assigning a plurality of DS-1 facilities associated with said plurality of failed network elements to at least a portion of said plurality of replacement network processing circuits;
- means for computing a plurality of sub-DS-1 circuit interconnections for said replacement network elements based upon said sub-DS-1 circuit data;
- means for setting initial parameters on said portion of said plurality of replacement network processing circuits; and
- means for executing said plurality of sub-DS-1 circuit interconnections in said plurality of replacement network elements.

7. The system of claim 6 wherein said plurality of replacement network elements are of a type different from said plurality of failed network elements.

8. The system of claim 6 wherein at least one of said plurality of replacement network elements is a Digital Access and Cross-Connect System.

9. The system of claim 6 wherein at least one of said plurality of replacement network elements is a Digital Access and Cross-Connect System II with expanded frame capacity.

10. The system of claim 6 wherein said disaster restoration vehicle further includes at least one computer.

11. The system of claim 10 wherein the means for setting initial parameters on said portion of said plurality of replacement network processing elements includes a computer program run on said computer.

12. The system of claim 10 wherein the means for executing said plurality of sub-DS-1 circuit interconnections in said plurality of replacement network elements includes a computer program run on said computer.

13. The system of claim 6 further including:
- means for verifying any terminated DS-1 facilities;
- means for verifying DS-1 facility assignments;
- means for verifying said initial parameters on said portion of said plurality of replacement network processing elements;
- means for verifying said plurality of sub-DS-1 circuit interconnections;
- means for sending the verified information to at least said first and second operations support systems; and
- means for updating records in at least said first and second operations support systems so as to permit resumption of normal pre-disaster telecommunication activity.

* * * * *